(12) United States Patent
Craig

(10) Patent No.: US 9,108,251 B2
(45) Date of Patent: Aug. 18, 2015

(54) CUTTING TOOL HAVING REPLACEABLE CUTTING TIP, A REPLACEABLE CUTTING TIP THEREFORE AND A METHOD OF SECURING A REPLACEABLE CUTTING TIP

(71) Applicant: Karen A. Craig, Greensburg, PA (US)

(72) Inventor: Karen A. Craig, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 334 days.

(21) Appl. No.: 13/705,412

(22) Filed: Dec. 5, 2012

(65) Prior Publication Data
US 2014/0154023 A1 Jun. 5, 2014

(51) Int. Cl.
| | | |
|---|---|---|
| B23B 51/02 | (2006.01) | |
| B23P 11/00 | (2006.01) | |
| B23B 51/00 | (2006.01) | |

(52) U.S. Cl.
CPC .............. *B23B 51/02* (2013.01); *B23B 51/00* (2013.01); *B23P 11/00* (2013.01); *B23B 2231/0204* (2013.01); *B23B 2251/02* (2013.01); *B23B 2260/0785* (2013.01); *B23B 2260/124* (2013.01); *Y10S 408/713* (2013.01); *Y10T 29/49948* (2015.01); *Y10T 279/16* (2015.01); *Y10T 403/559* (2015.01); *Y10T 403/56* (2015.01); *Y10T 408/89* (2015.01); *Y10T 408/90993* (2015.01); *Y10T 408/95* (2015.01)

(58) Field of Classification Search
CPC  B23B 51/00; B23B 51/02; B23B 2231/0204; B23B 2251/02; B23P 11/00
USPC ................ 408/231, 233, 713; 279/8, 99, 147; 403/292, 298, 299; 29/465
See application file for complete search history.

(56) References Cited

U.S. PATENT DOCUMENTS

| | | | |
|---|---|---|---|
| 37,358 A | 1/1863 | Pierce | |
| 1,926,925 A * | 9/1933 | Wescott | 403/296 |
| 2,374,919 A | 5/1945 | Bruseth | |
| 3,613,192 A | 10/1971 | Tanabe et al. | |
| 4,250,777 A | 2/1981 | Sorenson | |
| 4,512,696 A * | 4/1985 | Cukelj | 409/233 |
| 4,929,131 A * | 5/1990 | Allemann | 409/234 |
| 4,998,851 A * | 3/1991 | Hunt | 408/143 |
| 5,630,818 A | 5/1997 | Del Rio et al. | |
| 5,899,642 A * | 5/1999 | Berglow et al. | 407/40 |
| 5,961,259 A | 10/1999 | Ziegler | |
| 6,241,433 B1 * | 6/2001 | Rydberg et al. | 408/233 |
| RE37,358 E | 9/2001 | Del Rio et al. | |
| 6,394,711 B1 * | 5/2002 | Brosius | 408/57 |
| 6,485,235 B1 | 11/2002 | Mast et al. | |
| 6,565,291 B2 * | 5/2003 | Harpaz et al. | 407/53 |
| 6,783,308 B2 | 8/2004 | Lindblom | |
| 6,899,495 B2 | 5/2005 | Hansson et al. | |
| 6,964,547 B2 * | 11/2005 | Stojanovski | 409/233 |

(Continued)

*Primary Examiner* — Eric A Gates
(74) *Attorney, Agent, or Firm* — Larry R. Meenan

(57) ABSTRACT

A rotary cutting tool includes a cutting tip having a cutting portion adapted to perform cutting operations on a workpiece and a threaded aperture defined therein generally opposite the cutting portion. The cutting tool further includes a generally cylindrical tool body disposed about a central longitudinal axis, the tool body having a first end portion adapted to be coupled to a machine tool and an opposite second end portion including an aperture having a coupling mechanism disposed therein. The coupling mechanism includes a first threaded portion cooperatively engaged to the threaded aperture of the cutting tip. The first threaded portion is moveable with respect to the tool body in a manner that selectively couples the cutting tip to the tool body.

10 Claims, 4 Drawing Sheets

(56) References Cited

U.S. PATENT DOCUMENTS

| | | |
|---|---|---|
| 7,114,892 B2 | 10/2006 | Hansson |
| 7,134,816 B2 | 11/2006 | Brink |
| 7,329,073 B2 * | 2/2008 | Jonsson et al. ............... 408/233 |
| 7,753,628 B2 | 7/2010 | Hecht et al. |
| 7,775,751 B2 | 8/2010 | Hecht et al. |
| 8,043,030 B2 * | 10/2011 | Borschert et al. ............... 407/30 |
| 2003/0210963 A1 | 11/2003 | Kakai et al. |
| 2013/0251471 A1 * | 9/2013 | Craig et al. ................... 408/200 |

* cited by examiner

CUTTING TOOL HAVING REPLACEABLE CUTTING TIP, A REPLACEABLE CUTTING TIP THEREFORE AND A METHOD OF SECURING A REPLACEABLE CUTTING TIP

BACKGROUND

1. Field of the Invention

The invention relates to cutting tools for performing machining operations on a workpiece and, more particularly, to cutting tools having replaceable cutting tips. The invention further relates to replaceable cutting tips for use with such tools and methods of securing a replaceable cutting tip to a tool body.

2. Background Information

Conventional cutting tools can be of both one-part and multi-part design. Cutting tools of the type that make use of a holder part or tool body, as well as a separate, replaceable cutting part or insert, are especially common and may be of widely varying shapes and consist of, for instance, drilling tools, milling tools, thread cutters, etc. The tool body usually consists of a long narrow shank of a cylindrical basic shape having a first end adapted to be coupled in the chucking mechanism of a machine tool and a second end adapted to securely house the insert.

In modern machine tools, the tool bodies are typically sophisticated and expensive, and thus are designed to be used with replaceable cutting inserts, which constitutes the wearing part of the tools. In other words, it is profitable to manufacture the actual cutting part as a separate, detachable unit, which may be replaced after being worn-out, while the holder part may be used for a longer period of time (usually 10 to 20 exchanges).

In practice, the replaceable cutting insert is entirely or partly manufactured from a hard, wear-resistant material, such as cemented carbide or the like, while the tool body is made of a material having a greater elasticity, e.g. steel.

SUMMARY OF THE INVENTION

As one aspect of the present invention, a replaceable cutting tip is provided. The cutting tip includes a cutting portion adapted to perform cutting operations on a workpiece and a threaded aperture defined therein generally opposite the cutting portion.

As another aspect of the present invention, a rotary cutting tool is provided. The rotary cutting tool includes a cutting tip as described above and a generally cylindrical tool body disposed about a central longitudinal axis. The tool body has a first end portion adapted to be coupled to a machine tool and an opposite second end portion including an aperture having a coupling mechanism disposed therein. The coupling mechanism has a first threaded portion cooperatively engaged to the threaded aperture of the cutting tip. The first threaded portion is moveable with respect to the tool body in a manner that selectively couples the cutting tip to the tool body.

The coupling mechanism may comprise a coupling member disposed in, and rotatable with respect to, the tool body and the first threaded portion may comprise a first threaded portion of the coupling member.

The coupling member may further include a second threaded portion disposed opposite the first threaded portion, the second threaded portion being opposite-handed with respect to the first threaded portion and the coupling member may also include a splined portion disposed between the first threaded portion and the second threaded portion.

The coupling mechanism may further include a geared nut having a splined portion and a toothed portion wherein the geared nut is disposed about the coupling member such that the splined portion of the geared nut cooperatively engages the splined portion of the coupling member in a manner such that the splined portion of the coupling member is moveable axially along with respect to the geared nut.

The tool body may comprise a threaded aperture portion cooperatively engaged with the second threaded portion of the coupling member.

The tool body may include a changeout aperture disposed in the second end portion, the changeout aperture being structured to receive a changeout tool, and the toothed portion of the geared nut may be structured to cooperatively engage a portion of the changeout tool in a manner such that rotation of the changeout tool within the changeout aperture causes the geared nut, and thus the coupling member, to rotate generally about the central longitudinal axis.

The changeout aperture may extend generally transverse to the central longitudinal axis.

The first threaded portion of the coupling member may include threads disposed at a first pitch and the second threaded portion of the coupling member may include threads disposed at a second pitch different than the first pitch.

As yet another aspect of the present invention, a tool body is provided. The tool body includes a first end portion adapted to be coupled to a machine tool, an opposite second end portion including an aperture defined therein and a coupling mechanism disposed in the aperture. The coupling mechanism has a first threaded portion structured to cooperatively engage a threaded aperture of a cutting tip as previously described. The first threaded portion is structured to be moveable with respect to the tool body in a manner that selectively couples the cutting tip to the tool body.

The coupling mechanism may include a coupling member disposed in, and rotatable with respect to, the tool body and the first threaded portion may include a first threaded portion of the coupling member.

The coupling member may further include a second threaded portion disposed opposite the first threaded portion, the second threaded portion being opposite-handed with respect to the first threaded portion and the coupling member may also include a splined portion disposed between the first threaded portion and the second threaded portion.

The coupling mechanism may further comprise a geared nut having a splined portion and a toothed portion with the geared nut being disposed about the coupling member such that the splined portion of the geared nut cooperatively engages the splined portion of the coupling member in a manner such that the splined portion of the coupling member is moveable axially with respect to the geared nut.

The tool body may include a threaded aperture portion cooperatively engaged with the second threaded portion of the coupling member.

The tool body may include a changeout aperture disposed in the second end portion, the changeout aperture being structured to receive a changeout tool, and the toothed portion of the geared nut being structured to cooperatively engage a portion of the changeout tool in a manner that rotation of the changeout tool within the changeout aperture causes the geared nut, and thus the coupling member, to rotate generally about the central longitudinal axis.

The changeout aperture may extend generally transverse to the central longitudinal axis.

The first threaded portion of the coupling member may include threads disposed at a first pitch and the second threaded portion of the coupling member may include threads disposed at a second pitch different than the first pitch.

As a further aspect of the present invention, a method of securing a replaceable cutting tip to a tool body is provided. The method includes: inserting a changeout tool into a changeout aperture disposed in the tool body; aligning a threaded aperture defined in the cutting tip with an axially oriented threaded portion of a coupling member extending from an end of the tool body; inserting the threaded portion of the coupling member into the threaded aperture of the cutting tip; drawing the cutting tip into the tool body by rotating the changeout tool to a predetermined torque setting; and removing the changeout tool from the changeout aperture.

The method may further include securing the tool body in a chuck mechanism of a machine tool prior to inserting the changeout tool.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention

BRIEF DESCRIPTION OF THE DRAWINGS

A full understanding of the invention can be gained from the following description of the preferred embodiments when read in conjunction with the accompanying drawings in which.

Figure 1:
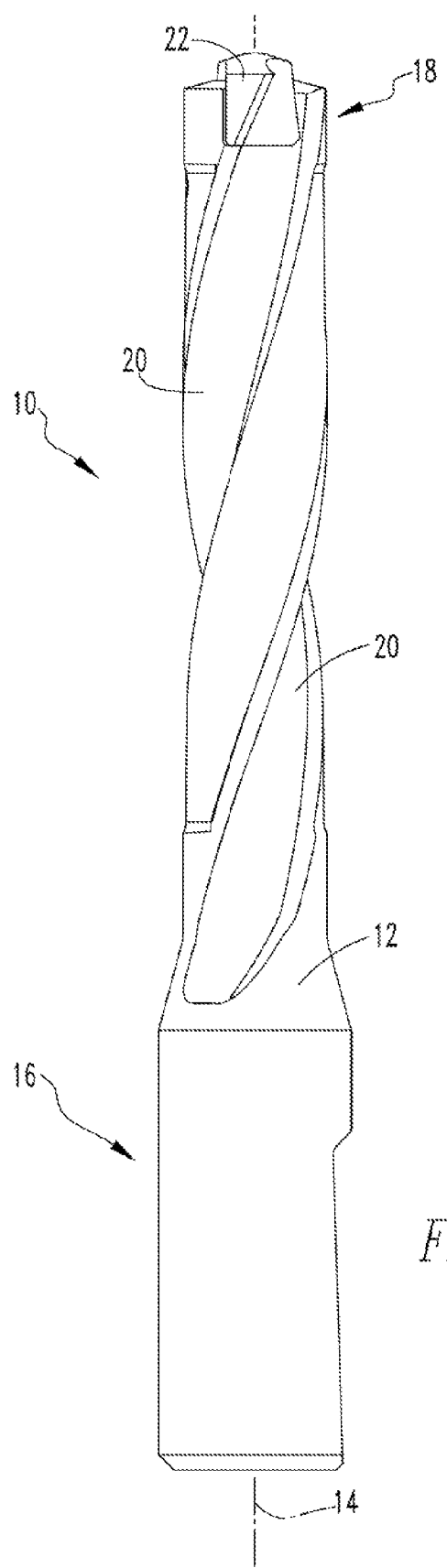
FIG. 1 shows a side elevational view of an example cutting tool in accordance with principles of the present invention.

Parts corresponding to one another are provided with the same designations in all the figures.

DESCRIPTION OF THE PREFERRED EMBODIMENTS

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality) and the singular form of "a", "an", and "the" include plural referents unless the context clearly indicates otherwise.

FIGS. 1-4 show an example embodiment of a cutting tool 10 in accordance with the principles of the present invention. In the exemplary embodiment shown, cutting tool 10 comprises a drill used for forming cylindrical holes in a workpiece (not shown) when either cutting tool 10 or the workpiece is rotated about an axis. However, it is to be appreciated that the concepts disclosed herein may also be applied to other cutting tools without varying from the scope of the present invention.

Referring to FIG. 1, cutting tool 10 includes a generally cylindrical tool body 12 disposed about a central longitudinal axis 14. Tool body 12 includes a first end portion 16 adapted to be coupled to a machine tool (not shown) and an opposite second end portion 18. Tool body 12 may include a number of flutes 20 formed therein extending generally from second end portion 18 toward first end portion 16. Cutting tool 10 further includes a removable/replaceable cutting tip 22 coupled to second end portion 18 of tool body 12.

Figure 2:
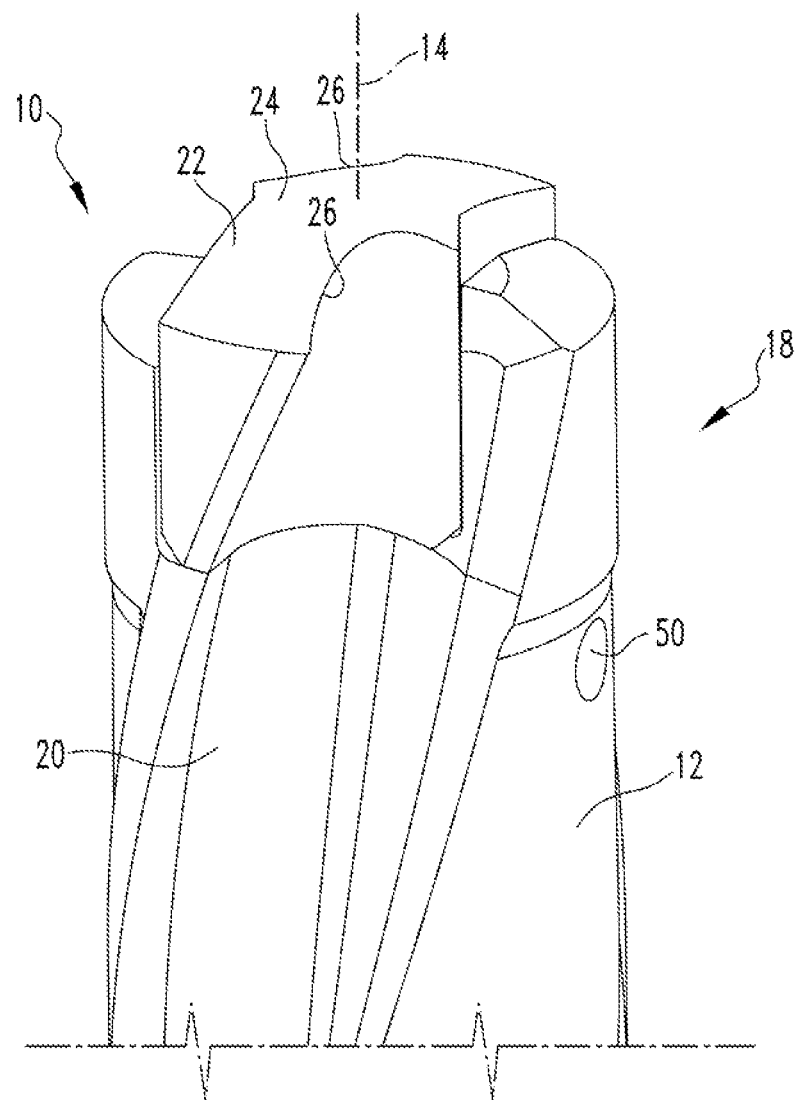
FIG. 2 shows an isometric detail view of the cutting end of the example cutting tool of FIG. 1.
Figure 3:
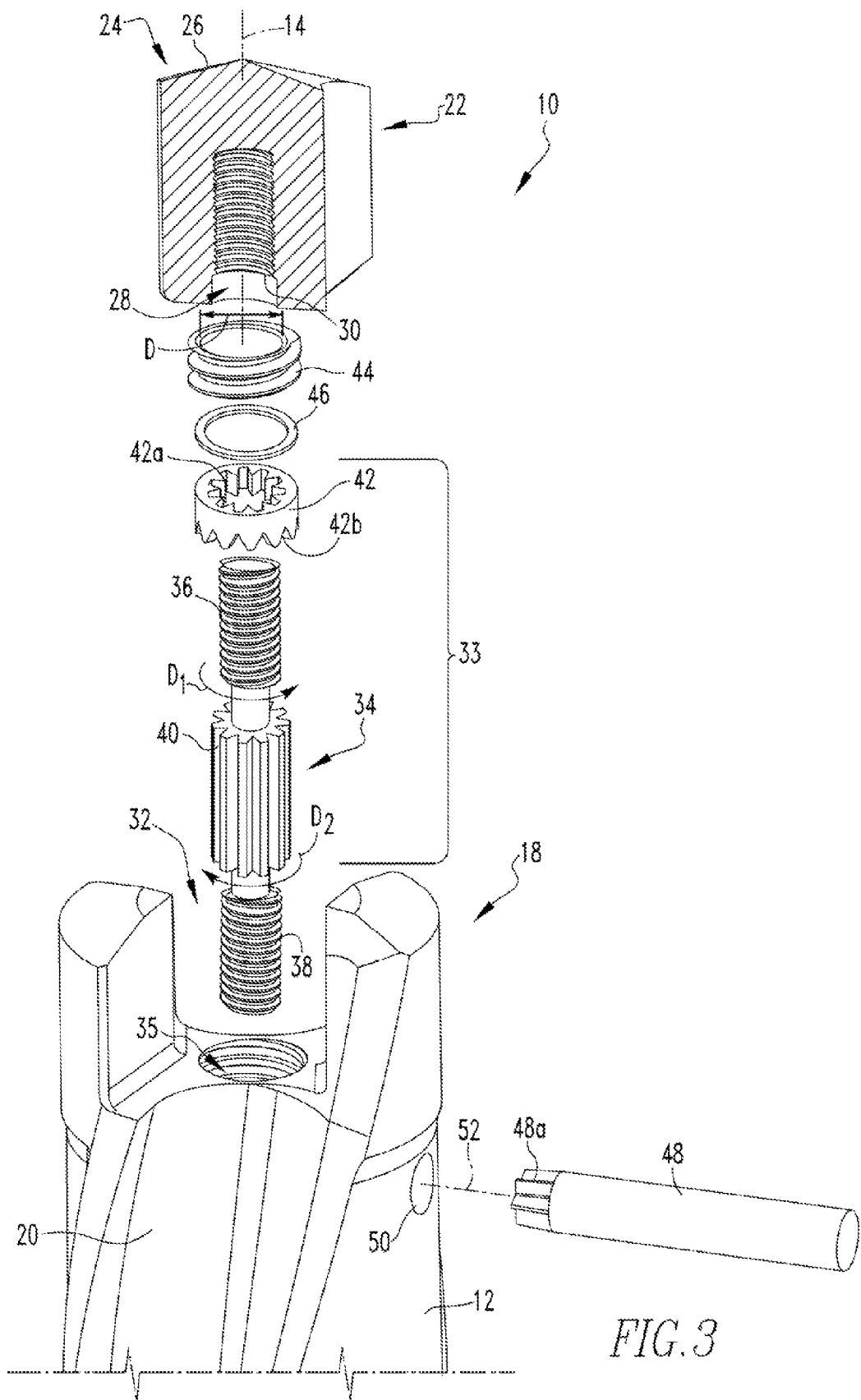
FIG. 3 is an isometric exploded detail view showing components of the cutting tool of FIG. 2 with the cutting insert shown in section.

Referring to FIGS. 2 and 3, cutting tip 22 includes a cutting portion 24, which includes a number of cutting edges 26 formed thereon, and a first threaded portion 28 disposed generally opposite cutting portion 24. In the illustrated exemplary embodiment, first threaded portion 28 is formed as a threaded aperture 30, discussed in further detail below, formed in the main body (not numbered) of cutting tip 12. It is to be appreciated that first threaded portion 28 may also be formed as a threaded sleeve around which cutting tip 12 is disposed and coupled.

Continuing to refer to FIG. 3, second end portion 18 of tool body 12 includes a housing 32 in which cutting tip 22 is generally disposed when coupled to tool body 12, such as shown in FIGS. 1 and 2. Housing 32 engages cutting tip 22 in a manner that acts to secure cutting tip 22 from rotational movement with respect to tool body 12. In the illustrated exemplary embodiment, housing 32 is generally formed as a slot disposed generally transverse to longitudinal axis 14, however, it is to be appreciated that other engagement structures between the tool body and the cutting tip which inhibit rotational movement and thus help to transfer forces between the cutting tip and the tool body may be employed as a housing without varying from the scope of the present invention.

Figure 4:
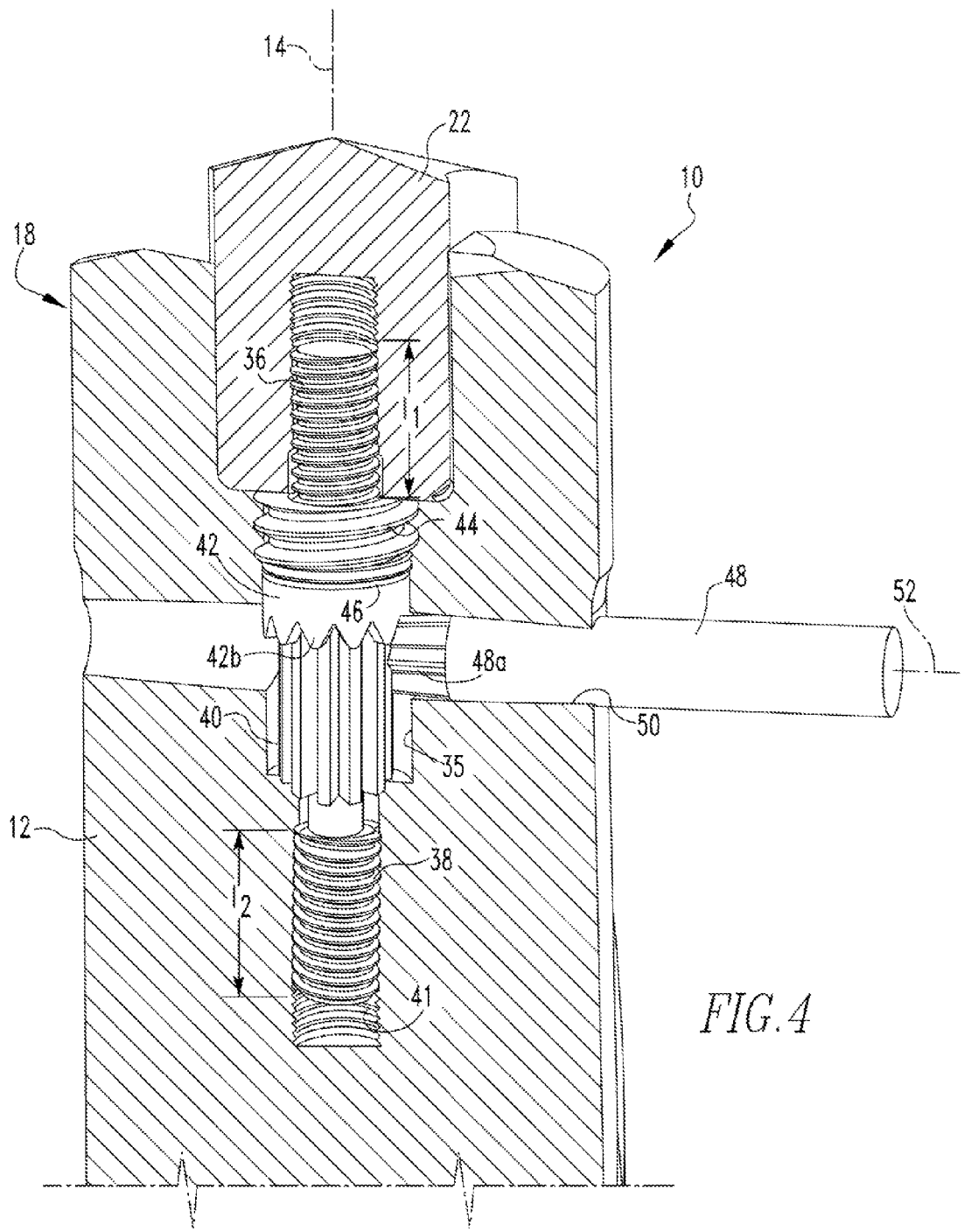
FIG. 4 is a cross sectional detail view of the cutting end of the example cutting tool of FIG. 1 shown with a portion of an example changeout tool engaging the cutting tool.

In order to axially secure cutting tip 22 within housing 32, and thus secure cutting tip 22 axially to tool body 12, second end portion 18 of tool body 12 includes a coupling mechanism 33. Referring to FIGS. 3 and 4, coupling mechanism 33 includes a coupling member 34 partially disposed in, and protruding partially from, an axial aperture 35 formed near second end portion 18 of tool body 12. Coupling member 34 is of generally cylindrical shape and includes a first threaded portion 36 disposed about a first end, a second threaded portion 38 of a reverse handedness as first threaded portion 36 disposed about an opposite second end and, and a splined portion 40 having a number of axially running splines (not numbered) disposed between first threaded portion 36 and second threaded portion 38. As shown in FIG. 4, first threaded portion 36 of coupling member 34 is adapted to threadingly engage threaded portion 28 (e.g., threaded aperture 30) of cutting tip 22. In order for such engagement, the threads (not numbered) of first threaded portion 36 are similarly sized and handed as the threads (not numbered) of threaded aperture 30. As also shown in FIG. 4, second threaded portion 38 of coupling member 34 is adapted to threadingly engage a threaded aperture portion 41 of axial aperture 35. In order for such engagement, the threads (not numbered) of second threaded portion 38 are similarly sized and handed as the threads (not numbered) of threaded aperture portion 41.

It is to be appreciated that the reversely threaded ends of coupling member 34 and their threadable engagement with each of cutting tip 22 and tool body 12 provides for cutting tip 22 to either be drawn axially toward tool body 12 upon rotation of coupling member 34 about longitudinal axis 14 in a first direction $D_1$ as shown in FIG. 3, or conversely, provides for cutting tip 22 to be ejected away from tool body 12 if coupling member 34 is rotated in an opposite second direction $D_2$ about longitudinal axis 14. In order to promote disengagement of cutting tip 22 from coupling member 34 before disengagement of coupling member 34 from tool body 12 (and thus generally retain coupling member 34 with tool body 12), the length $l_1$ of first threaded portion 36 which threadingly engages threaded aperture 30 of cutting tip 22 may be shorter than the length $l_2$ of second threaded portion 38 which threadingly engages threaded aperture portion 41 of tool body 12. Alternately or additionally, first threaded portion 36 of coupling member 34 (as well as threaded aperture 30) may be provided with a larger pitch (not labeled) than second threaded portion 38 (and threaded aperture portion 41) such that cutting tip 22 would disengage from coupling member 34 before tool body 12 would disengage from coupling member 34.

In order to provide for the rotation of coupling member 34 about longitudinal axis 14, coupling mechanism 33 includes a geared nut 42 having: a central axially splined portion 42a (FIG. 3) disposed about, and in sliding engagement with, splined portion 40 of coupling member 34; and a toothed portion 42b, disposed on a lower portion (not numbered) thereof, the function of which is described in detail below. As shown in FIG. 4, Geared nut 42 is provided in axial aperture 35 of tool body 12 such that geared nut 42 and coupling member 34 may freely rotate within axial aperture 35 about longitudinal axis 14, as discussed further below.

In the illustrated exemplary embodiment, geared nut 42 is retained in axial aperture 35 by a spanner nut 44 which threadedly engages a cooperatingly threaded portion (not numbered) of axial aperture 35. Spanner nut 44 includes a central bore having a diameter D of sufficient size to allow passage of coupling member 34 therethrough. As also shown in the illustrated exemplary embodiment, a number of washers, such as washer 46, may be provided adjacent geared nut 42 in order to provide added lubricity assisting in the free rotation of geared nut 42 within axial aperture 35.

As shown in the cross sectional detail view of FIG. 4, in order to install or remove cutting tip 22 from tool body 12, toothed portion 42b of geared nut 42 is cooperatively engaged by a correspondingly sized toothed portion 48a of a changeout tool 48 (FIGS. 3 and 4) which has been inserted into a changeout aperture 50 formed in second end portion 18 of tool body 12. Subsequent to the engagement of toothed portions 42b and 48a, changeout tool 48 is rotated within changeout aperture 50, which results in the simultaneous rotation of geared nut 42 about longitudinal axis 14 in either a clockwise, or counter-clockwise direction, depending on the direction in which changeout tool 48 is rotated about axis 52. Through such interaction with changeout tool 48, geared nut 42 may be rotated in a manner such that threaded aperture 30 of cutting tip 22 is threadedly engaged by first threaded portion 36 of coupling member 34 and subsequently drawn toward tool body 12 and tightened (preferably to a predetermined torque setting), thus securing cutting tip 22 to tool body 12. Conversely, geared nut 42 may be rotated by changeout tool 48 such that threaded aperture 30 of cutting tip 22 may be unthreaded from first threaded portion 36 of coupling member 34, and thus ejected away and uncoupled from tool body 12. Once the desired coupling or uncoupling of cutting tip 22 is accomplished, changeout tool 48 is removed from changeout aperture 50.

In the illustrated exemplary embodiment changeout aperture 50 is disposed generally transverse to longitudinal axis 14, however, it is to be appreciated that changeout aperture 50 may be oriented at other angles with respect to the longitudinal axis 14 without varying from the scope of the present invention. It is also to be appreciated that the mechanism as described herein through which cutting tip 22 may be quickly coupled or uncoupled from tool body 12 allows for such coupling or uncoupling of cutting tip 22 to be readily accomplished when first end portion 16 of tool body 12 is external to, or disposed within, a chuck mechanism of a machine tool. Hence, the present invention can be used to reduce changeout time by allowing cutting tip 22 to be swapped while tool body 12 is installed in a chuck mechanism of a machine tool.

It is to be appreciated that the present invention provides for a modular cutting tool that is simple to use and requires little to no maintenance. Machine downtime is minimized by allowing cutting insert changes to be quickly made while the tool body is installed on the machine tool. Additionally, the changeout mechanism described herein helps to expedite cutting tip changes by forcing the cutting tip outward from the tool body during untightening and pulling the insert in toward the tool body during tightening.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A rotary cutting tool comprising:
   a cutting tip comprising:
      a cutting portion adapted to perform cutting operations on a workpiece, and
      a threaded aperture defined therein generally opposite the cutting portion;
   a generally cylindrical tool body disposed about a central longitudinal axis, the tool body having a first end portion adapted to be coupled to a machine tool and an opposite second end portion including an aperture; and
   a coupling mechanism comprising:
      a coupling member disposed in, and rotatable with respect to, the aperture of the tool body, the coupling member comprising:
         a first threaded portion cooperatively engaged to the threaded aperture of the cutting tip,
         a second threaded portion disposed opposite the first threaded portion, the second threaded portion being opposite-handed with respect to the first threaded portion, and
         a splined portion disposed between the first threaded portion and the second threaded portion; and
      a geared nut having a splined portion and a toothed portion,
   wherein the geared nut is disposed about the coupling member such that the splined portion of the geared nut cooperatively engages the splined portion of the coupling member in a manner such that the splined portion of the coupling member is moveable axially with respect to the geared nut, and wherein the first threaded portion is moveable with respect to the tool body in a manner that selectively couples the cutting tip to the tool body.

2. The rotary cutting tool of claim 1 wherein the tool body comprises a threaded aperture portion cooperatively engaged with the second threaded portion of the coupling member.

3. The rotary cutting tool of claim 1 wherein the tool body includes a changeout aperture disposed in the second end portion, the changeout aperture being structured to receive a changeout tool, and wherein the toothed portion of the geared nut is structured to cooperatively engage a portion of the changeout tool in a manner such that rotation of the changeout tool within the changeout aperture causes the geared nut, and thus the coupling member, to rotate generally about the central longitudinal axis.

4. The rotary cutting tool of claim 3 wherein the changeout aperture extends generally transverse to the central longitudinal axis.

5. The rotary cutting tool of claim 1 wherein the first threaded portion of the coupling member comprises threads disposed at a first pitch and the second threaded portion of the coupling member comprises threads disposed at a second pitch different than the first pitch.

6. A tool body for use with a cutting tip having a cutting portion adapted to perform cutting operations on a workpiece and a threaded aperture defined therein generally opposite the cutting portion, the tool body comprising:
　a first end portion adapted to be coupled to a machine tool;
　an opposite second end portion including an aperture defined therein; and
　a coupling mechanism comprising:
　　a coupling member disposed in, and rotatable with respect to, the aperture, the coupling member comprising:
　　　a first threaded portion structured to cooperatively engage the threaded aperture of the cutting tip,
　　　a second threaded portion disposed opposite the first threaded portion, the second threaded portion being opposite-handed with respect to the first threaded portion,
　　　a splined portion disposed between the first threaded portion and the second threaded portion; and
　　a geared nut having a splined portion and a toothed portion,
　wherein the geared nut is disposed about the coupling member such that the splined portion of the geared nut cooperatively engages the splined portion of the coupling member in a manner such that the splined portion of the coupling member is moveable axially with respect to the geared nut, and
　wherein the first threaded portion is structured to be moveable with respect to the tool body in a manner that selectively couples the cutting tip to the tool body.

7. The tool body of claim 6 wherein the tool body comprises a threaded aperture portion cooperatively engaged with the second threaded portion of the coupling member.

8. The tool body of claim 6 wherein the tool body includes a changeout aperture disposed in the second end portion, the changeout aperture being structured to receive a changeout tool, and wherein the toothed portion of the geared nut is structured to cooperatively engage a portion of the changeout tool in a manner that rotation of the changeout tool within the changeout aperture causes the geared nut, and thus the coupling member, to rotate generally about a central longitudinal axis.

9. The tool body of claim 8 wherein the changeout aperture extends generally transverse to the central longitudinal axis.

10. The rotary cutting tool of claim 6 wherein the first threaded portion of the coupling member comprises threads disposed at a first pitch and the second threaded portion of the coupling member comprises threads disposed at a second pitch different than the first pitch.

\* \* \* \* \*